United States Patent [19]

Murphy

[11] 4,384,469
[45] May 24, 1983

[54] PITOT-STATIC TUBE TESTER SYSTEM

[75] Inventor: William J. Murphy, Dover, Del.

[73] Assignee: The United States of America as represented by the Secretary of the Air Force, Washington, D.C.

[21] Appl. No.: 249,255

[22] Filed: Mar. 30, 1981

[51] Int. Cl.³ .............................................. G01F 25/00
[52] U.S. Cl. .......................................... 73/3; 73/4 R
[58] Field of Search ....................................... 73/3, 4 R

[56] References Cited

U.S. PATENT DOCUMENTS

| | | | |
|---|---|---|---|
| 2,101,858 | 12/1937 | Knisley | 73/2 |
| 2,204,367 | 6/1940 | Kollsman | 73/212 |
| 2,358,367 | 9/1944 | Meerbeke | 73/212 |
| 2,679,163 | 5/1954 | Morris et al. | 73/212 |
| 3,318,146 | 5/1967 | De Leo et al. | 73/180 |
| 3,518,870 | 7/1970 | Shubert et al. | 73/3 |

*Primary Examiner*—S. Clement Swisher
*Attorney, Agent, or Firm*—Donald J. Singer; Frank J. LaMattina

[57] ABSTRACT

A system for testing, on the ground, an aircraft pitot-static pressure tube, its pitot and static pressure passageways and inlets, and the air pressure-sensitive flight instruments attached to the pitot-static pressure tube. The system includes a hollow adapter assembly into which the tip of the pitot-static pressure tube is inserted. When the tip is as far as it can go into the hollow adapter system, the pitot and static pressure inlets of the pitot-static tube are automatically in communication with their respective corresponding outlets in the hollow adapter assembly, irrespective of the orientation either of the pitot-static tube or of the hollow adapter assembly. This is accomplished with the use of a plurality of hollow spacers, internal of the hollow adapter body, which have flanged ends and form annular chambers that are intermediate of and in communication with the inlets and with the respective outlets. The hollow adapter assembly is releasably secured to the pitot-static tube by the use of rubber seals which, when compressed, expand, contact the tube, and hold it.

1 Claim, 3 Drawing Figures

PITOT-STATIC TUBE TESTER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention pertains generally to the testing art and, more particularly, to a novel testing system ideally suited for use in combination with a pitot-static tube of an aircraft.

pitot-static (pressure) tube is positioned in the forward external portion of an aircraft, such as at the leading edge of a wing or at the nose of the fuselage. The pitot-static tube comprises, in essence, a tube having a pitot pressure passageway and at least one static pressure passageway. The pitot pressure passageway at one end faces directly into the flowing stream of air in which the aircraft is flying (i.e., is downstream of the air flow and is facing upstream), and at the other end is connected to air pressure-sensitive instruments (e.g., an airspeed indicator). The static pressure passageway at one end is in the laminar flow of the stream of air in which the aircraft is flying, and at the other end is connected to other types of air pressure-sensitive instruments (such as altimeters, rate of climb indicators, and the like). It is to be noted that, in the more advanced types of modern aircraft, the pitot-static tube includes more than one static pressure passageway, i.e., usually two such passageways. The second static pressure passageway at one end also is in the laminar flow of the stream of air, and at the other end is connected to still other types of air pressure-sensitive instruments (such as, for example, a cabin pressure indicator).

It is fair and accurate to say that prior art pitot-static tube testers amd testing systems are bulky, expensive to buy, costly to maintain, and difficult and time-consuming to use, particularly because the inlets of the pitot pressure passageways and the inlets of the static pressure passageways must be precisely aligned with the openings (i.e., the outlets) in the tester to insure flow of air from the tester outlets to the tube inlets. This necessary feat becomes even more time-consuming and frustrating when the tester outlets-to-pitot-static tube inlets alignment must be made in the blind, either because of the structure of the tester which structurally prevents visual alignment, or because of the darkness of the environment in which this precise alignment is being attempted (e.g., in darkness, or in a poorly lighted portion of a hanger, or the like). To all of the foregoing problems incurred with the use of prior art testers is now added the economic problem of the great cost of obtaining a replacement component of the typical multi-component prior art tester. It is not unusual in these inflationary times that the cost of a replacement component exceeds the original cost of the entire tester kit. Additionally, the needed replacement component may not be readily available, so that prior art testers and tester kits, on the whole, are difficult to maintain in serviceable condition.

SUMMARY OF THE INVENTION

The instant invention eliminates all of the above-mentioned disadvantages of prior art pitot-static tube testers and testing kits. hereby, the invention constitutes a significant advance in the state-of-the-art.

In essence, the instant invention comprises an integrated (i.e., unified) tester adapter which can be easily and quickly secured to, and positioned in communication with, the pitot-static tube (and the pressure passageways therein) without requiring precise alignment (or any alignment) of the tube pressure inlets and of the corresponding openings (i.e., outlets) in the inventive tester/adapter.

Accordingly, an object of this invention is to provide a preferred embodiment of a pitot-static tube tester/adapter which eliminates the aforementioned disadvantages and problems of prior art testers and testing kits, including but not limited to the elimination of the need for the above-described precise alignment.

Another object of this invention is to provide a tester/adapter which is structurally integrated (i.e., unified), but which can be "broken down" into its components quickly and easily and without any special skill.

Still another object of this invention is to provide an integrated tester/adapter which comprises components that can be easily, quickly, and inexpensively replaced, in the unlikely event that replacement is necessary.

A further object of this invention is to provide an adapter which utilizes conventional, currently-available components that lend themselves to standard mass production techniques.

A still further object of this invention is to provide a pitot-static tube tester system, of which the aforesaid adapter is a component assembly.

These objects of this invention, as well as other objects related thereto (e.g., an adapter which can be easily and quickly secured to the pitot-static tube), will become readily apparent after a consideration of the description of the invention, together with reference to the contents of the Figures of the drawing.

DESCRIPTION OF THE PREFERRED EMBODIMENT

Figure 1:
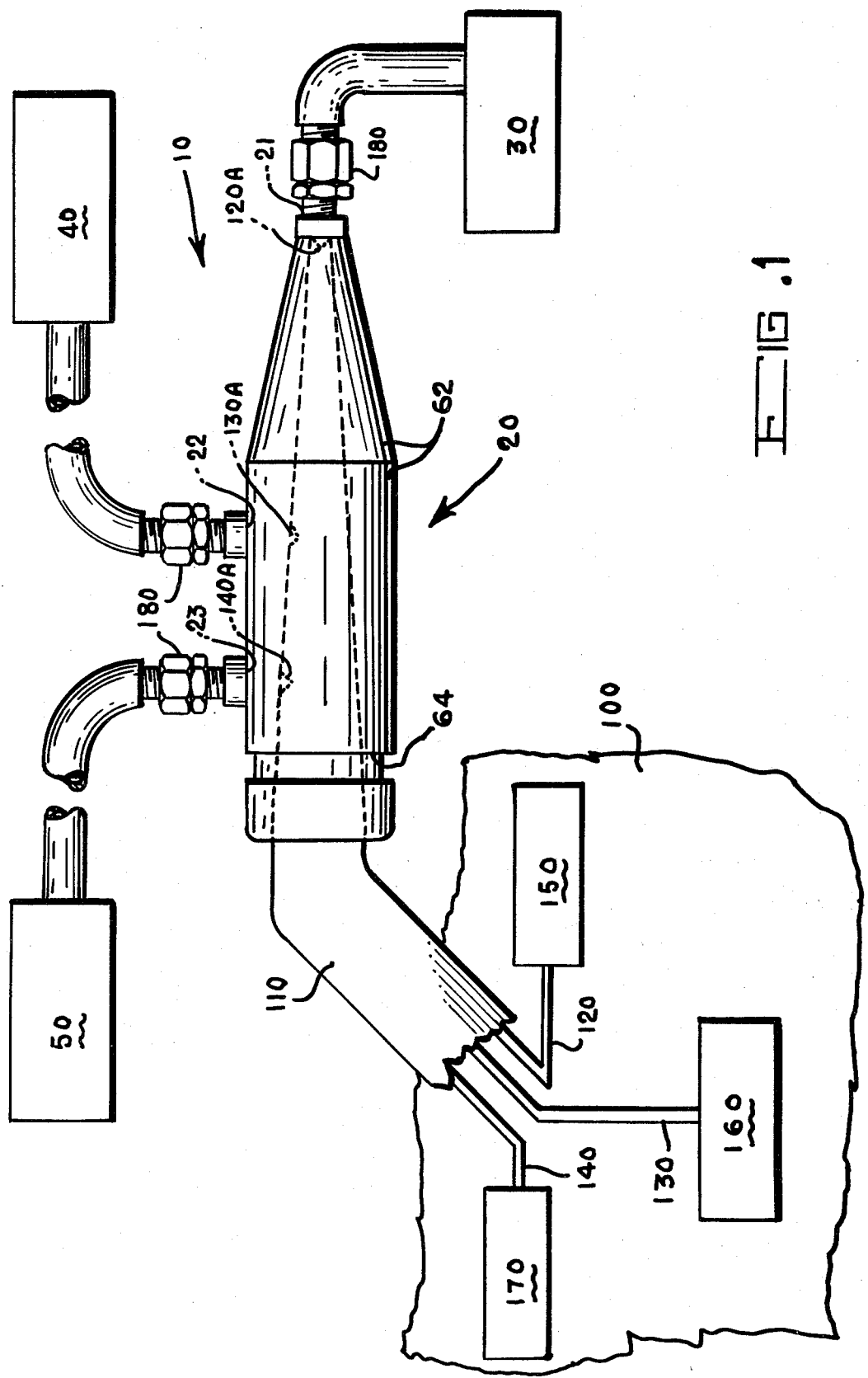
FIG. 1 is a side elevation view, in simplified schematic and pictorial form, partially fragmented, of a preferred embodiment of the inventive pitot-static tube tester system in use in its environment.

With reference to FIG. 1, there is shown a preferred embodiment 10 of the inventive pitot-static tube tester system in its working environment. It is here to be noted and remembered that the inventive system 10 is for use with (i.e., for use in combination with) a pitot-static tube 110 of an aircraft 100, while the aircraft 100 is on the ground (not shown). The pitot-static tube 110 is a representative typical on which has a pitot pressure passageway or conduit 120 (herein referred to as a "passageway") with an inlet 120A, and it also has at least one static pressure passageway or conduit 130 (hereinafter referred to as a "passageway") with an inlet 130A. However, it is to be noted that most modern aircraft have a pitot-static pressure tube 110 with a second static pressure passageway 140 with an inlet 140B. Accordingly, for illustrative purposes only, the pitot-static tube 110 is shown as having two static pressure passageways 130 and 140. The passageways 120, 130, and 140 are connected to different types of air pressure-sensitive instruments designated, respectively, 150, 160, and 170. Fittings are all similarly designated 180.

Figure 2:
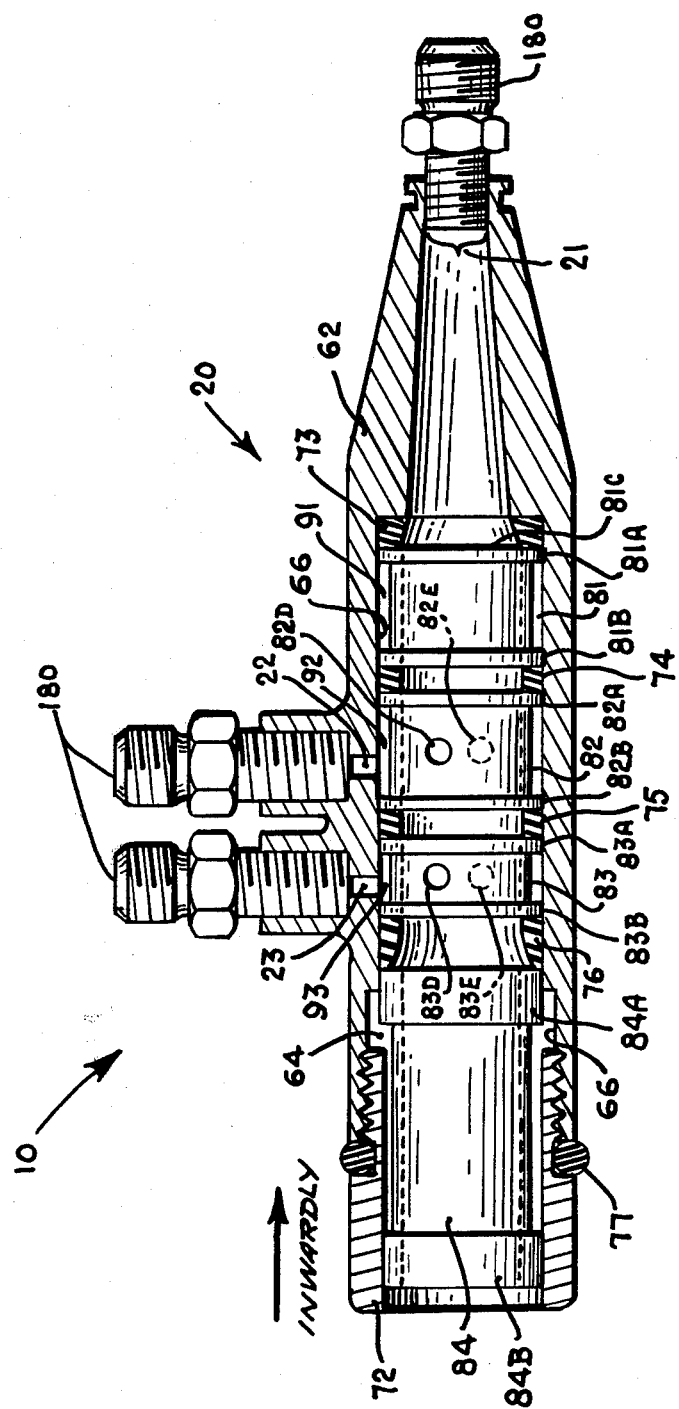
FIG. 2 is a side elevation view, in simplified schematic and pictorial form, partially in cross section, of the integrated pitot-static tube adapter assembly component of the invention.
Figure 3:
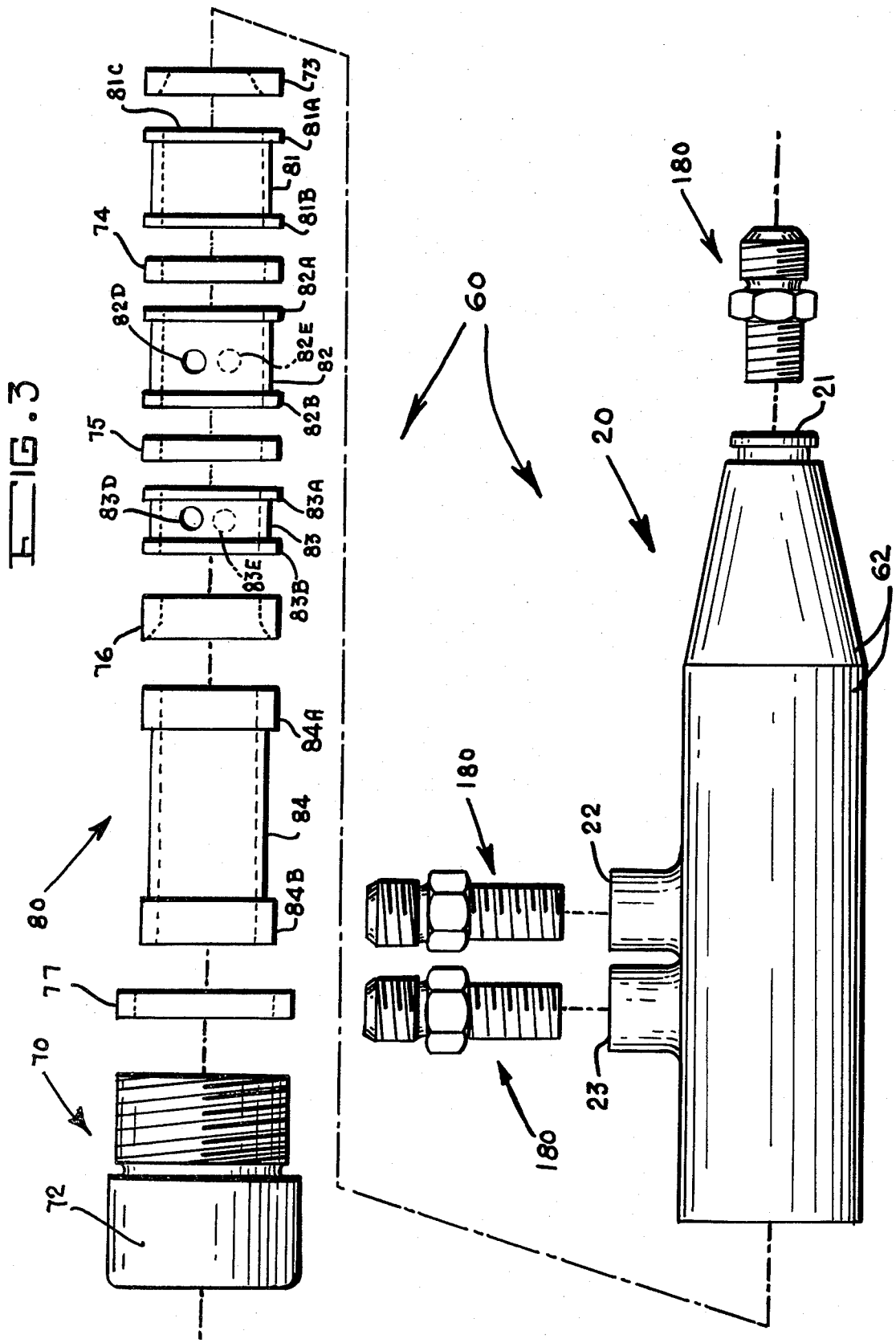
FIG. 3 is an exploded side elevation view, in simplified schematic and pictorial form, of the pitot-static tube adapter assembly component which is shown in its integrated (i.e., unified) condition in FIG. 1.

In the most basic and generic structural form, and with reference to FIGS. 1-3, inclusive, the inventive pitot-static tube tester system 10 comprises an integrated (i.e., unified) pitot-static (pressure) tube adapter assembly 20 which is hollow and which has a plurality of openings (i.e., pressure outlets), 21, 22 and 23, FIG. 2, which are in communication with, respectively, their corresponding pitot and static pressure passageways inlets. More specifically, pitot pressure outlet 21 of the adapter assembly 20 is in communication with pitot pressure inlet 120A of passageway 120 of pitot-static tube 110; a first static pressure outlet 22 of the adapter assembly 20 is in communication with first static pressure inlet 130A of passageway 130 of pitot-static tube 110; and, a second static pressure outlet 23 of the adapter assembly 20 is in communication with second static pressure inlet 140A of passageway 140 of pitot-static tube 110. The pitot-static tube tester system 10 further comprises: a source of pitot pressure (such as 30, FIG. 1) connected to the opening 21 (i.e., the outlet) in the tube adapter assembly 20 that is in communication with the inlet 120A of the pitot pressure passageway 120 of the pitot-static tube 110; and, a plurality of sources of static pressure (such as 40 and 50, FIG. 1), with one source for each one of the static pressure passageway inlets (such as 130A and 140A, FIG. 1), with each source of static pressure connected to a different one of the openings or outlets (such as 22 and 23, FIG. 2) in the pitot-static tube adapter assembly 20 that is in communication with a static pressure passageway inlet (e.g., pitot pressure source 40, FIG. 1, is in communication with opening or outlet 22 of the adapter assembly 20, which said opening 22 is, in turn, in communication with inlet 130A of passageway 130 of pitot-static tube 110).

With reference particularly to FIGS. 2 and 3, the pitot-static (pressure) tube adapter assembly 20 comprises, basically: an internal means (generally designated 60) for defining and separating the pitot pressure flow, the first static pressure flow, and the second static pressure flow, i.e., the pitot pressure flow from the source 30 of the pitot pressure to the flow into, within, and through the adapter assembly 20, and the static pressure flows from the sources 40 and 50 of static pressure to the flows into, within, and through the adapter assembly 20; and, means (generally designated 70) for releasably securing the adaptor assembly 20 to the pitot-static tube 117, wherein this means 70 is in association with the means 60 for defining and separating the pitot pressure flow and the static pressure flows.

The means 60 for separating the incoming pressure flows into, within, and through the adapter assembly 20 comprises, essentially, a hollow external member 62, FIGS. 2-3, inclusive, and a hollow sleeve-like subassembly 80, FIGS. 2 and 3, which is disposed internally of the hollow external member 62. More specifically, the hollow external member 62 has a pitot pressure opening 21, at least one static pressure opening 22 (although two 22 and 23 are preferred), an entrance opening 64, and an internal surface 66, with the pressure openings (i.e., outlets) 21, 22, and 23 in communication with, respectively, the pitot pressure inlet 120A and the static pressure inlets 130 and 140A of the pitot-static (pressure) tube 110. The hollow sleeve-like subassembly, 80, which is disposed internally of the hollow external member 62, includes a plurality (preferably 4) of hollow, aligned spacers (such as 81-84, inclusive) having end flanges (such as 81A and 81B for spacer 81, and the like) in contact with the internal surface 66 of the hollow external member 62 (as best seen in FIG. 2), with the result that annular spaces (such as 91-93, inclusive, best seen in FIG. 2) are formed between the spacers 81-83 and the internal surface 66 of hollow member 62. It is to be noted that one spacer (i.e., spacer 81) is disposed such that its hollow portion 81C, FIGS. 2 and 3, is in communication with the pitot pressure opening (i.e., outlet) 21 of the hollow external member 62 (as best been in FIG. 2). It is also to be noted that at least one spacer 82 (but preferably two spacers, such as spacers 82 and 83) of the plurality of spacers has at least one opening 82D (but preferably two such openings, such as openings 82D and 82E) therein which is (are) in communication with its corresponding annular space 92 and also is in communication with its corresponding static pressure opening 22 of the hollow external member 62 (best seen in FIG. 2). As a matter of preference and not of limitation, each of the two spacers 82 and 83 have two openings (i.e., openings 83D and 83 for spacer 83), the openings of each of the two spacers 82 and 83 are mutually opposed, and each of the two openings are in communication with its respective annular space (e.g., openings 83D and 83E are in communication with annular space 93) which results in each opening in each of these spacers 82 and 83 being also in communication with, respectively, hollow member static pressure outlet 22 and hollow member static pressure outlet 23.

With reference to FIGS. 1-3, inclusive, the means 70 for releasably securing the hollow adapter assembly 20 to the pitot-static pressure tube 110, FIG. 2, includes a hollow end member 72 connected to and in communication with the entrance opening 64 in the hollow external member 62, with this end member 72 being selectively movable inwardly (i.e., toward the pitot pressure outlet 21) of the hollow external member 62; and, a plurality of hollow seals (preferably 5), such as 73-77, inclusive, made of resilient material (preferably rubber) and interspersed among and between the plurality of spacers 81-84, inclusive. As a matter of preference and not of limitation, the fifth rubber seal 77 is disposed between the entrance opening 64 (of the hollow member 62) and the hollow end member 72, as best seen in FIG. 2.

As can be easily ascertained from FIG. 2, when the hollow end member 72 is moved inwardly of the hollow external member 62, the resilient seals 73-76, inclusive, are compressed and become enlarged not only outwardly (i.e., toward internal surface 66 of hollow external member 62), but also inwardly, i.e., toward the outer surface of the pitot-static pressure tube 110, the tip of which is disposed within the hollow member 62, through the hollow spacers 81-84, and through the hollow resilient seals 73-76. This enlargement inwardly of the seals 73-76 results in the contacting and in the holding of the (tip of the) pitot-static pressure tube 110, thereby also resulting in the releasable securing of the adapter assembly 20 to the pitot-static pressure tube 110.

It is further to the noted that, as a matter of preference, and not of limitation, the hollow external member 62 is machined from steel to reduce the possibility of thread damage, and upon completion is cadmium plated to prevent rust; that the spacers 81–84 are made of aluminum instead of steel in order to reduce the weight of the adapter assembly 20 as a whole; that the fittings (such as are similarly designated 180, FIGS. 1–3, inclusive) are made of aluminum, because they are inexpensive and readily available if replacements are needed; and, that hollow end member 72 is threadedly movable inwardly of the hollow external member 62.

MANNER OF USE AND OF OPERATION OF THE PREFERRED EMBODIMENT

The manner of use, and of operation, of the preferred embodiment 10 of the inventive pitot-static pressure tube tester system 10 can be easily ascertained by any person of ordinary skill in the art from the foregoing description, coupled with reference to the contents of the Figures of the drawing.

For others, the following simplified explanation is given. When a pitot-static pressure tube 110 or its passageways or conduits (120, 130 and 140) and/or their respective inlets (120A, 130A, and 140A), or the respective air pressure-sensitive flight instruments (such as 160, 170 and 180) are to be tested on the ground, the tip of the pitot-static pressure tube 110 is slid into the hollow adapter assembly 20, as far as it will go, as shown in FIG. 1. It is here to be noted that, although in FIG. 1 the static pressure inlets 130A and 140 of the pitot-static tube 110 are shown as being positioned directly opposite to (and aligned with) the outlets (i.e., oppenings) 22 and 23 in the hollow member 62, this is solely for convenience in illustrating the invention and usually does not (and never need) occur. Returning to the manner of use, when the tip of the pitot-static pressure tube 110 is as far as it will go in the hollow member 62, the tube 110 will be in the proper position, without one having to align the inlets 120, 130A and 140A with, respectively, the openings (i.e., outlets) 21, 22 and 23, irrespective of the orientation either of the pitot-static pressure tube 110 or of the adapter assembly 20. This is because inlet 120 will always align thoroughly and solely with outlet 21, and because annular spaces 92 and 93 will always result in, respectively, openings 82D and 82E of spacer 82 being in communication with outlet 130A by way of intermediate annular space 92, and openings 83D and 83E of spacer 83 being in communication with outlet 140A by way of intermediate annular space 93.

CONCLUSION

It is abundantly clear from all of the foregoing, and from the contents of the Figures of the drawing, that the stated objects of this invention 10, as well as other objects related thereto, have been achieved.

It is to be noted that, although there have been described and shown the fundamental and unique features of the inventive pitot-static pressure tube tester system, as applied to a preferred embodiment 10 and as adapted for in a particular application (i.e., in combination with a pitot-static pressure tube 110 that has two static pressure passageways 130 and 140 and two inlets 130A and 140A therefor), various other embodiments, variations, adaptations, substitutions, additions, omissions, and the like may occur to, and can be made by, those of ordinary skill in the art.

What is claimed is:

1. A pitot-static tube tester system for use with a pitot-static tube to be tested, wherein said pitot-static tube has one pitot pressure passageway with an inlet and two static pressure passageways with an inlet in each said static pressure passageway, said pitot-static tube tester system comprising:

a. a source of pitot pressure in communication with said inlet of said pitot pressure passageway of said pitot-static tube, wherein a pitot pressure flow emanates from this source;

b. two sources of static pressure, with one of these sources in communication with the inlet of one of said static pressure passageways of said pitot-static tube, and with the other of these sources in communication with the inlet of the other static pressure passageway of said pitot static tube, wherein a static pressure flow emanates from each of these sources;

c. an integrated pitot-static tube adapter assembly removably fitted over, releasably secured to, and selectively operably associated with said pitot-static tube, wherein said assembly includes:

a hollow external member made of steel and cadmium plated, with this member having one pitot pressure opening, two static pressure openings, an entrance opening, and an internal surface, wherein this member is removably fitted over said pitot-static tube such that the pitot pressure opening of this member and the pitot pressure passageway inlet of said pitot-static tube are in communication, and such that the two static pressure openings of this member are in communication with a different one of the two static-pressure inlets of said pitot-static tube;

a hollow sleeve-like subassembly which is disposed internally of said hollow external member and which includes a plurality of four aligned hollow aluminum spacers having end flanges in contact with said internal surface of said hollow external member, whereby annular spacers are formed between said spacers and said internal surface of said hollow external member, with two of said spacers each having two openings therein which are in communication with their corresponding annular spacers and which are also in communication with their respective static pressure openings of said hollow external member, with another of said spacers disposed such that its hollow portion is in communication with said pitot pressure opening of said hollow external member;

a hollow end member connected to and in communication with said entrance opening in said hollow external member, wherein said end member is threadedly movable inwardly of said hollow external member; and a plurality of five hollow rubber seals interspersed between and among said plurality of four aligned aluminum spacers;

whereby said hollow external member and said hollow-sleeve like subassembly define and separate said three pressure flows from each other; and whereby when said end member is moved inwardly of said hollow external member, said hollow rubber seals are compressed and become enlarged, thereby said enlarged seals contact and hold said pitot-static tube, and thereby releasably secure said adapter assembly to said pitot-static tube.

* * * * *